United States Patent [19]

Baggarley et al.

[11] Patent Number: 4,836,477
[45] Date of Patent: Jun. 6, 1989

[54] PARACHUTE RELEASE DEVICES

[76] Inventors: Anthony J. Baggarley, 12 Malin Road, Littlehampton, Sussex, England, BN17 6NN; Brian R. Farthing, 6 Grange Park, Ferring, Sussex, England, BN12 5LS

[21] Appl. No.: 189,429
[22] Filed: May 2, 1988
[51] Int. Cl.$^4$ ............................................. B64D 17/56
[52] U.S. Cl. .................................... 244/147; 244/149
[58] Field of Search ........... 244/147, 149, 150, 151 A, 244/151 B

[56] References Cited

U.S. PATENT DOCUMENTS 3,330,606 1/1967 Starer et al. ......................... 244/149
3,690,605 9/1972 Jones ................................... 244/149

Primary Examiner—Sherman D. Basinger
Assistant Examiner—Anne Sartelle
Attorney, Agent, or Firm—Dowell & Dowell

[57] ABSTRACT

The invention provides a release device for a secondary parachute canopy intended to operate when during a descent after a main parachute canopy should have been opened by normal operation, the rate of descent exceeds a chosen value indicating some form of failure of the main canopy, comprising a negative rate diaphragm arranged to experience atmospheric pressure on a first side and a reference pressure on the opposite side, an operating member which is movable between a canopy retaining position and a canopy releasing position by movement of the diaphragm, a valve arranged to selectively open the chamber to atmospheric pressure to inhibit operation of the diaphragm, an air bleed arranged to allow air to enter the chamber during a descent to balance the atmospheric pressure on the diaphragm, and a float valve sensitive to rate of descent arranged to close the bleed when a chosen rate of descent is exceeded, thus to trap the reference pressure in the chamber and to apply operating differential pressure to the diaphragm.

9 Claims, 1 Drawing Sheet

U.S. Patent   Jun. 6, 1989   4,836,477
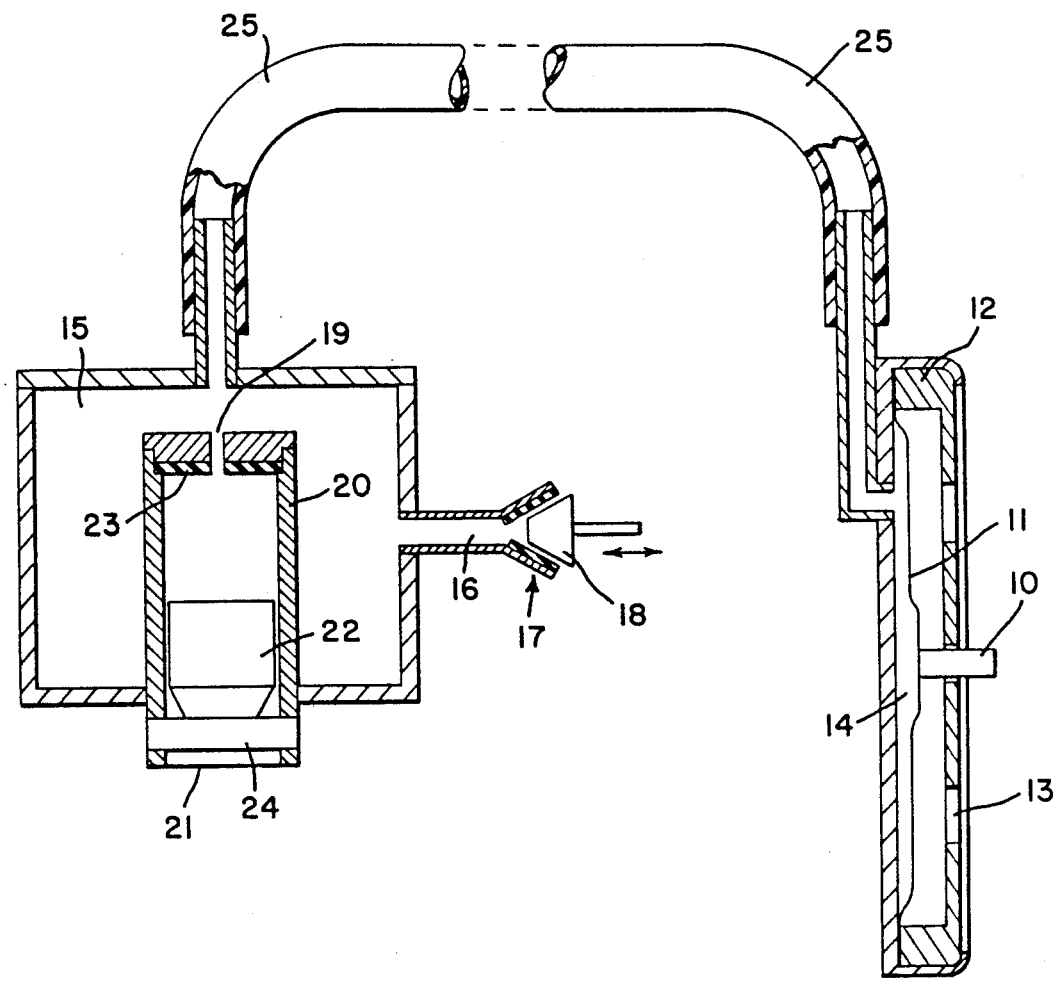

PARACHUTE RELEASE DEVICES

BACKGROUND OF THE INVENTION

This invention relates to means for automatically releasing a packed parachute canopy to deploy the canopy in chosen circumstances, and is particularly, but not exclusively, concerned with means for automatically releasing a secondary parachute in the event that a primary parachute has failed to deploy correctly or fails after deployment during a descent.

Automatic parachute release devices have been proposed to release a main parachute canopy at a predermined height above the ground during a so called free fall parachute drop, either as the primary means of releasing the canopy or as a safety back-up to cover the event of error or incapacity of a parachutist. The basic design of such release mechanisms includes a barometric capsule arranged to move a locking pin which retains an operating arm of the parachute release mechanism thus allowing movement of the operating arm to release the canopy. The release height is adjusted by adjusting the position of the capsule and pin relative to the release arm; and as the capsule is fully evacuated adjustment is made allowing for the ambient barometric pressure immediately before use.

In order to cover the event that the canopy fails to deploy at the desired height, typically 1000 meters (3000 feet) above ground, or collapses after deployment; a secondary or reserve parachute is usually carried, and means is provided to automatically deploy the secondary canopy once below the chosen height in the event of failure of the primary canopy. The release means for the secondary canopy detects failure of the main canopy by detecting an abnormal rate of descent and must of course be inhibited from operating during any free fall phase of a drop. A rate of fall in excess of typically 25 meters per second (70 feet per second) is considered indicative of a canopy failure or malfunction; and below 1000 metres this corresponds to a rate of pressure change of 2.3 to 2.5 millibars per second.

Devices so far proposed to respond to such rates of change of pressure have involved the use of very sensitive sensing diaphrams, and these devices have been prone to respond to transient pressure pulses releasing the secondary canopy erroneously. With known devices it is thought that even the small transient pressure pulses that might arise within the parachutist's clothing during normal movement, could erroneously cause release of the secondary canopy.

OBJECTS OF THE INVENTION

It is an object of the present invention to provide a release device which is suitable for releasing such secondary parachutes reliably in use while not sufferring the disadvantages of the known devices.

SUMMARY OF THE INVENTION

Accordingly the present invention provides a release device for a parachute canopy, comprising a negative rate diaphragm arranged to experience atmospheric pressure on one side and a reference pressure in a chamber on its opposite side, an operating member moveable between a canopy retaining position and a canopy releasing position by movement of the diaphragm, valve means to selectively open the chamber to atmospheric pressure to inhibit operation of the diaphragm, air bleed means arranged to allow air to enter the chamber during a descent to balance the atmospheric pressure on the diaphragm, and means sensitive to rate of descent arranged to close the bleed means when a chosen rate of descent is exceeded, thus to apply operating pressure to the diaphragm.

Preferably the valve means and the bleed means are provided separately.

Preferably the valve means comprises a valve operable by the means for opening a main canopy at a chosen height so that the device is prevented from operating until the main canopy has been released.

Preferably the bleed means comprises an orifice disposed at the top of a substantially vertical tube which is open to the atmosphere at the bottom, and the means for closing the bleed means comprises a float valve member disposed in the tube and adapted to rise and seal the orifice when the air flow rate around it in the tube corresponds to the desired rate of descent.

In one preferred embodiment the valve means and the bleed means communicate with a reservoir chamber which in turn communicates with the reference chamber by way of a microbore tube.

BRIEF DESCRIPTION OF THE DRAWING

In order to promote a fuller understanding of the above, and other, aspects of the present invention an embodiment will now be described by way of example only with reference to the accompanying drawing which shows a schematic diagram of a parachute canopy release device.

DESCRIPTION OF PREFERRED EMBODIMENT

In the drawing there is shown a release device for releasing a secondary parachute canopy after a main canopy has been released and for some reason failed to arrest the rate of descent.

The release device comprises an operating member in the form of a pin 10 which is arranged to lock or release a release arm (not shown) of a secondary canopy, movement to the left as seen in the diagram being movement to release the arm and thus the canopy. The pin 10 is directly connected to a negative rate diaphragm 11 mounted in a housing 12 so as to experience atmospheric pressure through ports 13 in the housing on one side and a reference pressure in a chamber 14 formed in the housing on the other side.

The chamber 14 is connected by means of a microbore tube 25 to a reservoir chamber 15. The chamber 15 is provided with two air inlets. The first of these, an inlet 16, is controlled by a valve 17, the closure member 18 of which is operatively connected to the release arm (not shown) of the main canopy so that the valve 17 is closed only when the main canopy has been released, that is after any free fall phase of the descent. The second inlet is an air bleed orifice 19 provided in a lower face of the reservoir chamber in communication with the top of a substantially vertical tube 20 extending below that face of the reservoir chamber. The bottom 21 end of the tube 20 is open to atmospheric pressure.

A float valve member 22 is provided in the tube 20 to be a free, but close, fit therein so that it rides up in the tube when air flows through the tube to the reservoir chamber at above a chosen flow rate, to seal off the air bleed orifice 19. A Silicone rubber seal ring 23 is provided around the orifice 19 to assist in sealing the float valve, while a cross pin 24 in the bottom of the tube 20 prevents the float valve 22 from falling out of the tube.

In use the device shown starts with the valve 17 open during the ascent before a parachute jump. Thus as atmospheric pressure drops with height so the reference pressure in the chamber 14 drops with it and there is no differential pressure acting on the diaphragm 11. Once the descent commences, the reverse happens and the pressure on each side of the diaphragm rises so that again there is no differential pressure on the diaphragm.

When the chosen height is reached the primary canopy is released by means which is conventional per se, and as a result the valve 17 is closed and remains closed during futher descent. From this point onwards pressure equalization on the diaphragm 11 can only be achieved by the flow of air into the reservoir chamber 15, and thence to the chamber 14, through the bleed orifice 19. This causes air flow in the tube 20 past the float valve 22, and if the flow rate reaches a value corresponding to the rate of descent which is predetermined as indicating a main canopy failure or malfunction, the float valve 22 rises with the viscous friction of the air flowing past it to close the orifice 19.

When the orifice 19 is closed the reference pressure in the chamber 14 is fixed and further descent will cause a differential pressure on the diaphragm 11 causing it to snap over thus causing the pin 10 to release the secondary canopy.

Until such time as the rate of descent reaches the chosen value the air flow through the bleed orifice 19 is insufficient to cause the float valve to rise off the cross pin 24.

The orifice 19 and the valve 17 are designed for minimum flow rates and the tube 25 is a micro-bore tube and the whole system is such that the diaphragm is damped to reduce its free state sensitivity. The valve 17 is designed to have a small permanent bleed even when closed, which is adjustable in production to compensate for variations in flow rates in the tube 20 due to manufacturing tolerances in the tube, the float and the orifice. This permanent bleed also allows the reservoir chamber 15 to bleed to the ambient atmospheric pressure in the event that the float valve sticks in a position sealing the orifice 19. If the next operational use occurs before the reference pressure in the chamber 15 and the chamber 14 have reached ambient atmospheric pressure, then the float valve 22 will be drawn down the tube during the ascent thus re-setting the operative sequence.

Thus it can be seen that the embodiment of the invention provides a release system which is reliable and will operate at a chosen rate of descent, while being insensitive to transient pressure changes and resulting false operation.

What is claimed is:

1. A release device for a parachute canopy, comprising a negative rate diaphragm arranged to experience atmospheric pressure on a first side and a reference pressure in a reference chamber on the opposite side of the diaphragm, an operating member which is movable between a canopy retaining position and a canopy releasing position by movement of the diaphragm, valve means arranged to selectively open the reference chamber to atmospheric pressure to inhibit operation of the diaphragm, air bleed means arranged to allow air to enter the chamber during a descent to balance the atmospheric pressure on the diaphragm, and means sensitive to rate of descent arranged to close the bleed means when a chosen rate of descent is exceeded, thus to trap said reference pressure in the reference chamber and to apply operating differential pressure to the diaphragm.

2. A release device as claimed in claim 1, in which said valve means and said bleed means are separate items.

3. A release device as claimed in claim 1, in which said valve means comprises a valve operable by means provided for the opening of the parachute at a chosen height during a descent, whereby the operation of the release device is inhibited until the parachute is released.

4. A release device as claimed in claim 1, in which said bleed means comprises an orifice disposed adjacent the top of a substantially vertical tube which is open to the atmosphere at the bottom, and said means for closing the bleed means comprises a float valve member disposed in the tube and adapted to rise and seal the orifice when the air flow rate around it in the tube corresponds to the desired rate of descent.

5. A release device as claimed in claim 1, in which a reservoir chamber is interposed between said bleed means and said reference chamber.

6. A release device as claimed in claim 5, in which said valve means communicates with said reservoir chamber.

7. A release device as claimed in claim 5, in which said bleed means comprises an orifice adjacent the top of a substantially vertical tube and said means for closing the bleed means comprises a float valve member disposed in the tube and adapted to rise in the tube and seal the orifice when the flow rate around it in the tube corresponds to a desired rate of descent.

8. A release device as claimed in claim 7, in which said tube is disposed substantially inside said reservoir chamber.

9. A release device as claimed in claim 5, in which said reservoir chamber communicates with said reference chamber by means of a microbore tube.

* * * * *